(12) United States Patent
Grez

(10) Patent No.: US 10,694,832 B2
(45) Date of Patent: Jun. 30, 2020

(54) HAIR COLOR SYSTEM USING A SMART DEVICE

(71) Applicant: L'Oréal, Paris (FR)

(72) Inventor: Joseph Grez, North Bend, WA (US)

(73) Assignee: L'Oréal, Paris (FR)

( * ) Notice: Subject to any disclaimer, the term of this patent is extended or adjusted under 35 U.S.C. 154(b) by 0 days.

(21) Appl. No.: 14/586,138

(22) Filed: Dec. 30, 2014

(65) Prior Publication Data

US 2016/0183664 A1    Jun. 30, 2016

(51) Int. Cl.
| | |
|---|---|
| A45D 44/00 | (2006.01) |
| A45D 19/02 | (2006.01) |
| G06T 7/90 | (2017.01) |
| A45D 19/00 | (2006.01) |

(52) U.S. Cl.
CPC ........... *A45D 44/005* (2013.01); *A45D 19/02* (2013.01); *G06T 7/90* (2017.01); *A45D 2019/0083* (2013.01); *A45D 2019/0091* (2013.01); *A45D 2044/007* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 5,289,835 A | 3/1994 | Harlan et al. | |
| 5,511,270 A | 4/1996 | Eliachar et al. | |
| 5,937,864 A | 8/1999 | Diaz | |
| 5,937,865 A | 8/1999 | Dhaliwal | |
| 6,012,462 A | 1/2000 | Schmittou | |
| 7,156,104 B2 | 1/2007 | Kennedy et al. | |
| 7,537,139 B2 | 5/2009 | Jackson et al. | |
| 7,917,983 B2 | 4/2011 | Taggart et al. | |
| 8,109,278 B2 | 2/2012 | Lee | |
| 2002/0010556 A1* | 1/2002 | Marapane | A45D 44/005 702/32 |
| 2003/0065450 A1* | 4/2003 | Leprince | A45D 44/005 702/19 |
| 2004/0163188 A1* | 8/2004 | Firkins | A61Q 5/10 8/406 |
| 2007/0076013 A1* | 4/2007 | Campbell | G09G 5/06 345/589 |
| 2011/0138556 A1 | 6/2011 | Sanchez Martinez | |
| 2012/0234340 A1* | 9/2012 | Firkins | A61K 8/00 132/212 |
| 2014/0107543 A1 | 4/2014 | Pazouki | |
| 2015/0173488 A1* | 6/2015 | Witchell | G01F 1/42 222/23 |

\* cited by examiner

*Primary Examiner* — Jiangeng Sun
(74) *Attorney, Agent, or Firm* — Jensen & Puntigam P.S.; Clark A. Puntigam

(57) ABSTRACT

A smart device having a hair color application (App) stored thereon capable of providing and receiving hair color information to and from a user. A photograph of the user's hair is taken using the smart device. A palette of possible colors is then calculated in view of the photograph and other hair information provided by the user. The smart device includes a display for showing the calculated colors, and for showing colors selected by the user on the user's hair.

10 Claims, 2 Drawing Sheets

HAIR COLOR SYSTEM USING A SMART DEVICE

TECHNICAL FIELD

The present disclosure concerns a hair coloring system and/or method, and more particularly concerns such a system/method which includes the use of a smart device, such as a smart phone.

BACKGROUND

Hair coloring systems in general are well known, including both salon-based and home-based systems. Home-based systems involve the selection of an individual package or packages of a selected hair color, following the instructions on the package to produce the formulation, and then applying the resulting formulation to the hair, which can be difficult or at least inconvenient. The results, furthermore, can be unpredictable with the resulting color on the hair not being what was anticipated from photographs or other information on the hair color packages.

Hence, a home-based hair coloring system is desirable which is more accurate in terms of actual color on the user's hair, as well as being convenient to use.

SUMMARY

Accordingly, a system for coloring hair comprises: a smart device for use with a hair color appliance, having a hair coloring application stored therein for providing and receiving information to and from the user, wherein the information received includes desired hair color information and selected information about the hair to be colored and an image of the user's present hair color taken by the smart device, wherein the smart device is programmed to calculate a palette of hair colors, taking into account the user-provided information, including the desired hair color and the user's present hair condition or to receive such calculated palette of hair colors from a remote source, and further includes a selector for the user to select one or more colors from the palette of colors and an output to program the hair color appliance to provide a target color formulation based on user input.

BEST MODE

Figure 1:
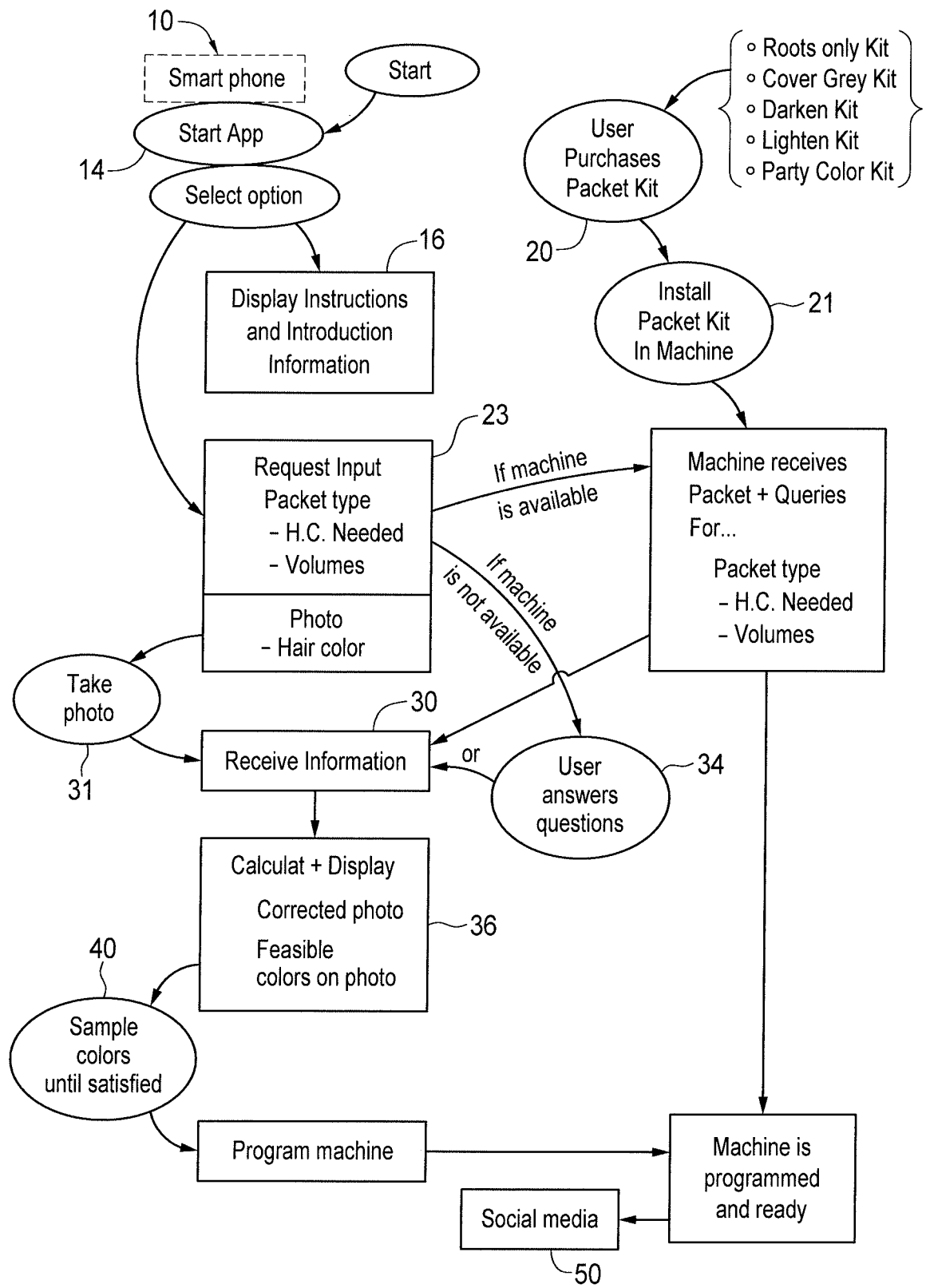
FIG. 1 is a flow chart showing the system and its operation.
Figure 2:
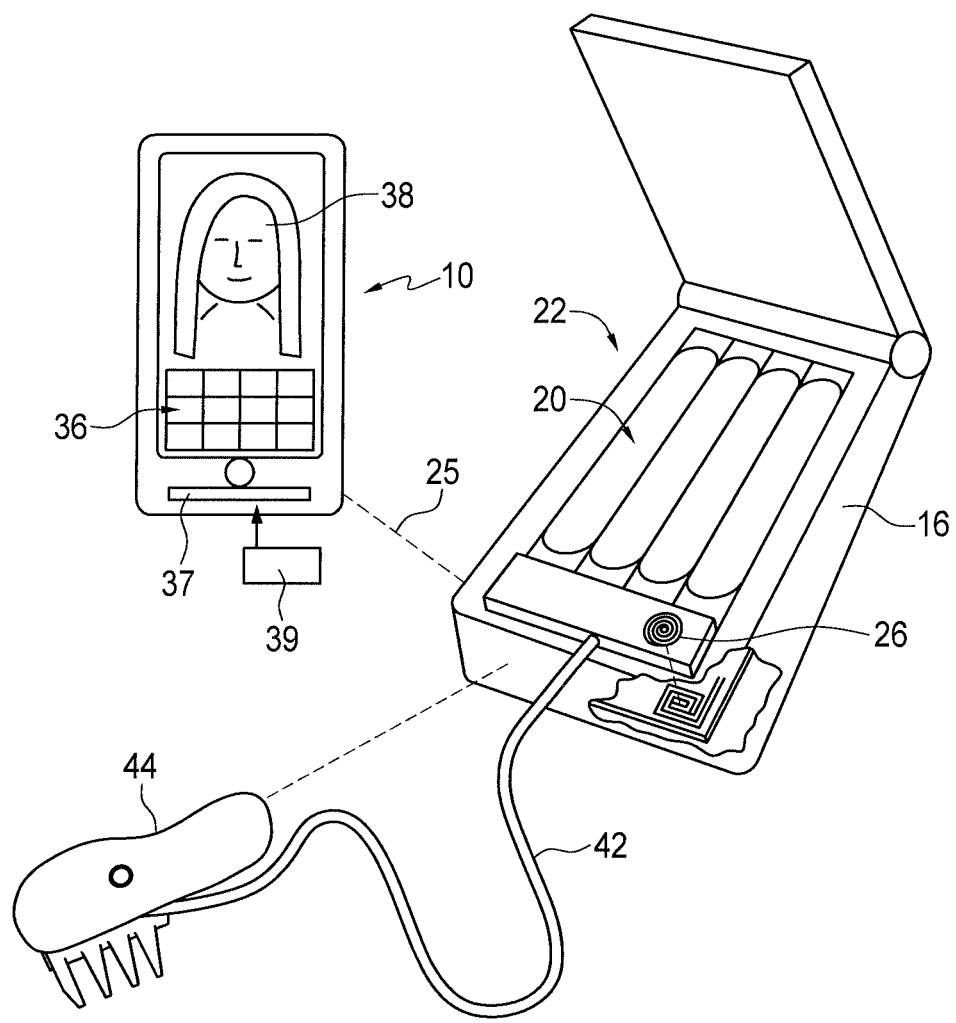
FIG. 2 is a schematic view of the system itself

FIG. 1 shows the basic system of the present disclosure in function (smart device App), while FIG. 2 represents the basic hardware/structural items of the system. The system includes a smart device, shown generally at 10 in FIG. 2, for example, a smart phone, which includes a hair color application App (37) in memory, disclosed below. It should be understood that a smart phone is only one of a variety of smart devices which can be used for the present system, which could include, for instance, a tablet or laptop or similar device, including any smart device which can accommodate the App described below, or a smart device embedded in the hair color appliance.

Initially, the user will begin by opening up the App on the phone, shown at block 14 (start App), which will display introductory information and instructions concerning the use of the App to produce a desired hair color formulation, shown in block 16. The user can also bypass the introduction and proceed to the system. The system includes a color appliance 22 shown in FIG. 2. In one variation of the system, the user purchases a desired hair color packet kit. The packet, shown generally at 20 in FIG. 2, is installed (block 21) in a formulation-producing appliance 22. The appliance 22 itself can be any one of a number of different arrangements, operating with a color packet. One arrangement is shown and described in co-pending application Ser. No. 14/554,789, which is owned by the assignee of the present invention. The contents of that application are hereby incorporated by reference.

The packet 20 is installed in the appliance 22 by the user. There are several packet types possible, as shown. There may be other types as well. The packet 20 includes coloring data for a specific packet type, directed toward a specific coloring need/function, including, for instance, roots-only coloring, cover-grey coloring, darkening coloring, lightening coloring or party coloring, which refers to various bright colors, e.g. green, blue, etc. The user, in operation of the App can determine whether a machine, i.e. an appliance, such as 22, is in fact available via a query from the App, shown at block 23. If an appliance is available and a packet has been installed, the appliance will query the packet concerning the hair color (H.C.) desired and the nature of the specific hair coloring application (roots, etc.), including the volume of formulation needed for the specific function. The appliance will then send the information back to the smart device, at block 30.

The request from the smart device (block 23) can be accomplished in various ways, illustrated by communication line 25 in FIG. 2, including blue tooth, wireless and RFID, shown at 26. As indicated above, if the appliance is available and has packet information (block 21), that information will provided back to the smart phone. The receipt of the information at the smart phone is shown at block 30.

If there is no machine available, or a packet has not been installed, the user is prompted to answer two questions, first, whether the user's hair is presently colored gray, and if so, when was the last coloring, and second, whether or not the color desired by the user is a change to the natural color of the user's hair, shown at block 34.

The smart device is then used to take one or more photos of the user's hair, shown at block 31, and provided as another input to the App (block 30). In some cases, a color matching card 39, in the color packet kit or obtained separately can be used and photographed in order to correct inaccuracies in the photo by the camera, shown at block 36. At this point, the smart phone has the required information, including photographs, from the user or the packet appliance 16. The photograph can be displayed on the smart device at 38.

A calculation (block 36) is then made in the App or remotely relative to determining particular color formulations which will satisfy the expressed specific hair color need by the consumer in view of the existing color/condition of the user's hair.

A program is established within the smart phone or remotely, which utilizes the information provided by the hair color packet and/or the information provided by the user and the photograph of the user's hair to produce a palette of possible colors 36 shown on the smart device. The program itself is routine, based on existing knowledge, including use of conventional color wheel information. For instance, the program will assess the information in the photo to determine the particular hair color in the photo, such as for example brown 3, and then assess the significance of whether or not the color is either a natural color or from a coloring event. Grey percentage and other darkness/lightness of color is also determined, so that using color wheel opposites can shift colors within the lightening and darkening axis. The program also will access the level of darkness of existing hair and the desired color information provided by the user to provide a palette of possible colors. It is also possible to use a stored table which identifies suitable colors, with the information provided by the user, specifically the photo and/or the hair coloring kit described above to produce the palette 36. The result of the calculation is a plurality of colors, referred to as a palette, and shown at 36 in FIGS. 1 and 2. At this point, the user can see the various colors in the palette 36 on the smart phone. These are the colors which are feasible for the user in view of the information provided. Display 38 of the user's hair can then be altered to include any one of the colors in the palette, referred to as sample colors, at 40. When the user is satisfied with a particular palette color, the appliance 22 is programmed to produce that particular color by control of the output of the various color packets and/or a developer packet, again as described in patent application Ser. No. 14/554,789, or by any other hair color appliance capable of delivering a variety of hair color formulations in response to a particular color command instruction. The individual pumps on the various color packets (red, dark brown and blonde) can be controlled to provide the selected color.

The resulting formulation is then delivered via output tube 42 to a brushhead 44, which can be used to apply the hair formulation to the user's hair. In one variation, the bristles are movable and can be controlled, with pumping of the formulation, which can be controlled via electronic communication, wireless, etc. between the appliance and the brushhead.

Effective hair coloring is thus accomplished by means of a smart device with interaction by the user, operating with an appliance for producing the selected hair color formulation.

The selected hair color formulation can be identified by various numerical or other designations which identify the particular color. This information, along with a photograph of the user with the selected hair color, can then be transmitted to one or more social media outlets, as shown at block 50. Interaction with others via social media is thus possible, with a number of people sharing the hair color information and a resulting photograph provided by the initial user. Others can then share their own information and photographs.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A system for coloring hair of a user, comprising:
a programmed smart device, the smart device having a hair coloring application stored therein for providing and receiving information from the user, including an image of the user's present hair color taken by the smart device;
a hair coloring appliance which is configured and arranged to physically receive a hair color packet kit, the color packet kit including several color packets, each with a different color to accomplish a selected hair color function, the hair coloring appliance including associated pumps for the several color packets in the color packet kit;
wherein the smart device is programmed to query the hair coloring appliance and to receive information indicating that the hair coloring appliance is available for use;
wherein the hair color packet kit installed in the hair coloring appliance includes hair color packet kit information, including the hair color desired by the user, the selected hair coloring function and volume of formulation needed for the selected hair coloring function;
wherein in operation, the hair coloring appliance provides said hair color packet kit information to the hair coloring application present in the smart device;
wherein the hair coloring application in the smart device is programmed to determine a palette of different hair colors, each of which is feasible for the user in view of the hair color packet information provided by the appliance and/or the user, taking into account the image of the user's present hair color, including the grey percentage and level of darkness thereof, or to receive said palette of different hair colors from a remote source;
wherein the smart device communicates to the user all of said palette of different hair colors at one time, permits the user to see the different hair colors in the palette on the smart device and permits visual change of the user's present hair color to the image taken by the smart device to any of the different hair colors in the displayed palette of different hair colors;
a user-controlled selector permitting the user to select one hair color from the communicated palette of hair colors; and
wherein the hair coloring appliance is programmed to control the pumps on the individual color packets in the installed color packet kit to automatically provide the formulation for the selected hair color selected by the user from the palette of different hair colors.

2. The system of claim 1, wherein the smart device includes a negotiation or communication component including circuitry configured to initiate a protocol that allows the smart device and the hair coloring appliance to identify each other and negotiate or agree on one or more common communication keys.

3. The system of claim 2, wherein information provided to the smart device through the appliance includes one or more of the following (a) hair roots coloring information; (b) coloring to cover gray information; (c) coloring to darken hair color information; (d) coloring to lighten hair color information; and (e) party color information.

4. The system of claim 1, wherein the smart device is a smart phone and wherein the hair coloring application on the smart phone provides instructions for use of the system.

5. The system of claim 4, including hair color information used by the hair coloring application to adjust a photograph taken by the smart device to a more accurate hair color.

6. The system of claim 1, wherein the smart device provides output information to a social media site concerning a hair color formulation selected by the user.

7. The system of claim 6, wherein the output information includes a photograph of the user with a selected hair color.

8. The system of claim 1, wherein in the event that a hair coloring appliance is not available to the programmed inquiry or a packet is not installed in the appliance, the user is prompted to answer whether the user's hair is presently colored grey, the time of the last coloring and whether or not the desired color is a change to the natural color of the user's hair.

9. The system of claim 1, wherein the smart device includes a display for showing the calculated palette of colors and wherein the hair coloring application is programmed to permit the user to change the hair color of the image of the user's present hair color.

10. A method for coloring hair of a user, comprising the steps of:
- configuring a smart device with an app for receiving information from a user and providing information to the user, including an image of a user's present hair color taken by the smart device;
- selecting a color packet kit, the color packet kit including several color packets, each with a different color, to accomplish a selected hair color function;
- installing the color packet kit in the hair coloring appliance, the hair coloring appliance including associated pumps for the individual color packets in the installed color packet kit;
- programming the smart device to query the hair coloring appliance and to receive information from the hair coloring appliance that the hair coloring appliance is available for use;
- obtaining information by the hair coloring appliance from the color packet kit installed therein, the information including the hair color desired by the user, the selected hair coloring function and the volume of formulation needed for the hair coloring function;
- providing said color packet kit information to the application in the smart device by the hair coloring appliance;
- programming the hair coloring application in the smart device to determine a palette of hair colors, each of which is suitable for the user in view of the information provided by the hair coloring appliance and/or the user, taking into account the image of the user's present hair color, including the gray percentage and level of darkness thereof, or to receive said palette of hair colors from a remote source;
- programming the hair coloring application in the smart device to display to the user said palette of different hair colors in one display;
- providing the user an opportunity to change the hair color of the image of the user's present hair color using said palette of hair colors and further permitting the user an opportunity to select one hair color from the display of different hair color; and
- programming the hair coloring appliance for control of the pumps for the individual color packets in the color packet kit in the hair coloring appliance to automatically provide the formation for the selected one hair color by the user.

* * * * *